United States Patent
Marushima et al.

(10) Patent No.: US 7,028,486 B2
(45) Date of Patent: Apr. 18, 2006

(54) COOLANT RECOVERY TYPE GAS TURBINE

(75) Inventors: Shinya Marushima, Hitachinaka (JP); Manabu Matsumoto, Ibaraki-machi (JP); Kazuhiko Kawaike, Hitachinaka (JP); Takashi Ikeguchi, Hitachi (JP); Takashi Machida, Tsuchiura (JP); Masaru Sekihara, Chiyoda-machi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/782,961

(22) Filed: Feb. 23, 2004

(65) Prior Publication Data

US 2004/0163394 A1   Aug. 26, 2004

Related U.S. Application Data

(60) Division of application No. 10/403,124, filed on Apr. 1, 2003, now Pat. No. 6,735,957, which is a continuation of application No. 10/082,062, filed on Feb. 26, 2002, now Pat. No. 6,568,191, which is a division of application No. 09/308,981, filed as application No. PCT/JP96/03503 on Nov. 29, 1996, now Pat. No. 6,393,829.

(51) Int. Cl.
*F02G 7/12* (2006.01)
(52) U.S. Cl. ............... 60/806; 60/805; 60/784
(58) Field of Classification Search ............... 60/805, 60/806, 784, 786; 415/114
See application file for complete search history.

(56) References Cited

U.S. PATENT DOCUMENTS

| | | |
|---|---|---|
| 5,472,313 A | 12/1995 | Quinones et al. |
| 5,593,274 A | 1/1997 | Carreno et al. |
| 5,695,319 A | 12/1997 | Matsumoto et al. |
| 5,755,556 A | 5/1998 | Hultgren et al. |
| 5,758,487 A | 6/1998 | Salt et al. |
| 5,795,130 A | 8/1998 | Suenaga et al. |
| 6,007,299 A * | 12/1999 | Uematsu ............... 416/96 R |
| 6,195,979 B1 * | 3/2001 | Fukuyama ............... 60/806 |
| 6,334,756 B1 * | 1/2002 | Akiyama et al. ........... 415/116 |
| 6,370,866 B1 * | 4/2002 | Marushima et al. ........ 60/805 |
| 6,393,829 B1 * | 5/2002 | Marushima et al. ........ 60/806 |
| 6,405,538 B1 * | 6/2002 | Akiyama et al. .......... 60/782 |
| 6,491,495 B1 * | 12/2002 | Marushima et al. ...... 416/96 R |
| 6,514,038 B1 * | 2/2003 | Akiyama et al. ......... 415/116 |
| 6,568,191 B1 * | 5/2003 | Marushima et al. ........ 60/806 |

(Continued)

FOREIGN PATENT DOCUMENTS

EP    0 894 943 A1    2/1999

(Continued)

*Primary Examiner*—William H. Rodriguez
(74) *Attorney, Agent, or Firm*—Mattingly, Stanger, Malur & Brundidge, P.C.

(57) ABSTRACT

An object is to improve the operational reliability of a gas turbine by suppressing thermal stress and thermal deformation acting on the rotor of the gas turbine. The gas turbine has a rotor shaft constructed by arranging, in an axial direction in turn, a plurality of discs each having a plurality of combustion gas-driven moving blades annularly arranged on the peripheral portion and spacers arranged between the discs, and is characterized in that gap portions are formed between a region, on the rotor shaft center portion side, of the above-mentioned discs facing the spacers and spacers adjacent thereto, contact surfaces are formed both of which contact on both a region, on the rotor peripheral side, of the above-mentioned discs facing the spacers and adjacent spacers thereto, and a third flow path leading fluid to the above-mentioned gap portions is provided.

4 Claims, 5 Drawing Sheets

U.S. PATENT DOCUMENTS 6,568,192 B1 * 5/2003 Akiyama et al. ............. 60/806
6,735,957 B1 * 5/2004 Marushima et al. .......... 60/806

FOREIGN PATENT DOCUMENTS

| JP | 64-8504 | 1/1989 |
|----|---------|--------|
| JP | 3-275946 | 12/1991 |
| JP | 06-143041 | 1/1996 |
| JP | 8-14064 | 1/1996 |
| JP | 07-081028 | 10/1996 |
| JP | 8-277725 | 10/1996 |

\* cited by examiner
COOLANT RECOVERY TYPE GAS TURBINE This is a divisional application of U.S. Ser. No. 10/403,124, filed Apr. 1, 2003 now U.S. Pat. No. 6,735,957; which is a continuation application of U.S. Ser. No. 10/082,062, filed on Feb. 26, 2002, now U.S. Pat. No. 6,568,191; which is a divisional application of U.S. Ser. No. 09/308,981, filed May 28, 1999, now U.S. Pat. No. 6,393,829; which is a 371 of PCT/JP96/03503, filed Nov. 29, 1996. This divisional application is also related to U.S. Ser. No. 09/754,383 filed Jan. 5, 2001.

TECHNICAL FIELD

The present invention relates to a gas turbine in which moving blades are cooled and, more particularly, to a gas turbine of closed cooling type in which coolant for cooling moving blades is recovered.

Further, the present invention relates to a gas turbine in which thermal stress is relaxed by heating an axis portion of a rotor shaft at a starting time.

TECHNICAL BACKGROUND

In JP A 3-275946, concerning gas turbines having flow passages for supply/recovery of coolant to/from moving blades arranged inside discs and spacers forming a rotor, a gas turbine is disclosed which is provided with solid discs having no central hole at a center thereof (a shaft center).

DISCLOSURE OF THE INVENTION

Metal temperature distribution of a rotor and thermal stress and thermal deformation applied on the rotor are affected by the heat from and to spaces inside the rotor and a peripheral surface of the rotor, etc.

On the other hand, in JP A 3-275946 any concrete measures are not taken for the above-mentioned heat affection.

During unsteady operation at a starting time, the temperature rises largely in the rotor peripheral portion by the heat inputted from a working gas of the gas turbine, while it is not easy for the central portion of the rotor to be warmed.

Further, in the case where a supply path and a recovery path for a blade cooling coolant are provided, thermal stress in the rotor of gas turbine of closed cooling type becomes large because a temperature difference corresponding to a temperature increment due to cooling of the moving blades occurs between the supply path and the recovery path, so that there is a fear that a large stress is applied on the rotor central portion by overlapping of the thermal stress applied on the rotor discs, etc. and centrifugal force caused by rotation.

Therefore, an object of the present invention is to provide a gas turbine in which operational reliability thereof is improved by suppressing thermal stress applied on a rotor central portion.

A first feature of the present invention resides in a gas turbine having a rotor shaft constructed by arranging, in an axial direction in turn, a plurality of discs each having a plurality of combustion gas-driven moving blades annularly arranged on the peripheral portion and spacers arranged between the discs, and is characterized in that the above-mentioned discs each are formed in solid disc, gap portions are formed between a region, on the rotor shaft center portion side, of the above-mentioned discs facing the spacers and spacers adjacent thereto, contact surfaces are formed both of which contact on both a region, on the rotor peripheral side, of the above-mentioned discs facing the spacers and adjacent spacers thereto, and a third flow path leading fluid to the above-mentioned gap portions is provided.

Thereby, it is possible to control heat flow from and to the rotor members, to reduce thermal stress applied on the rotor members and to improve reliability of the rotor members at a time of starting.

A second feature of the present invention resides in a gas turbine having a rotor shaft constructed by arranging, in an axial direction in turn, a plurality of discs each having a plurality of combustion gas-driven moving blades annularly arranged on the peripheral portion and spacers arranged between the discs, the above-mentioned moving blades having flow path introducing coolant for cooling the moving blades and discharging out the coolant heated by the combustion gas, and is characterized in that contact surfaces are formed both of which contact on both a region, on the rotor peripheral side, of the above-mentioned discs facing the spacers and adjacent spacers thereto, and a supply path, for supplying the above-mentioned coolant for cooling the moving blades, passing through the above-mentioned discs and spacers in the region forming the above-mentioned contact surfaces in an axial direction of the rotor and a recovery path for the coolant heated through the moving blades are provided.

As constructional flow paths of supply flow path and recovery flow path, a supply flow path and a recovery flow path for coolant are provided which pass through discs or spacers in the axial direction from inside the contact surfaces of the discs and discs or of the discs and spacers, the discs and spacers are separated from each other by the contact surfaces, whereby it is unnecessary to provide attachments such as separation pipes, connection pipes for separation of the flow paths, so that there is no fear that the attachments fall down and are broken and reliability is raised.

BEST MODE FOR PRACTICING THE PRESENT INVENTION

Figure 1:
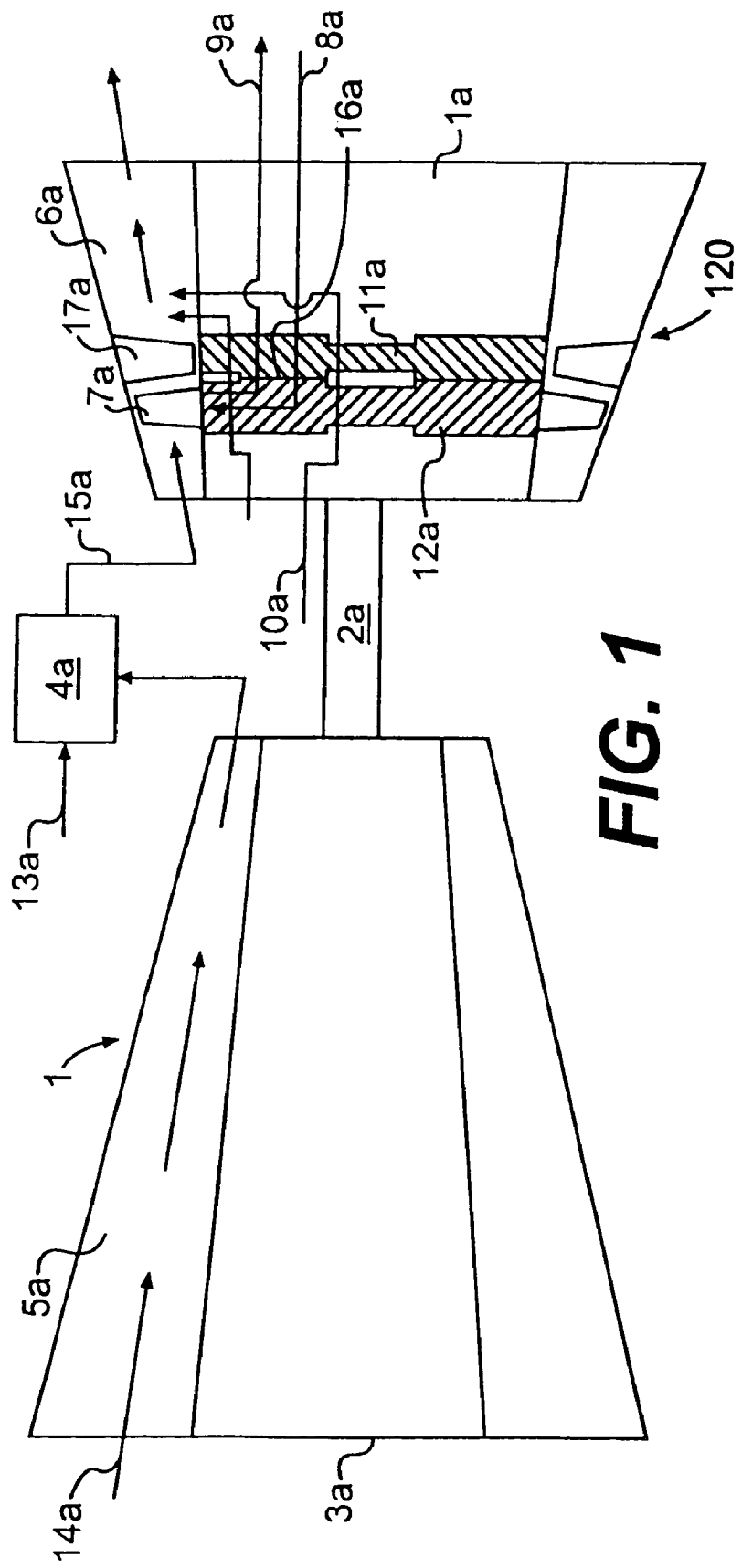
FIG. 1 is a schematic diagram of a gas turbine of coolant recovery type of an embodiment of the present invention.

In a gas turbine of the present embodiment, a gas turbine of recovery type coolant can be applied. For example, compressed air and compressed nitrogen can be applied as a coolant. An embodiment described hereunder, which is a case of a gas turbine of coolant recovery type, will be explained, taking steam as an example of a recovery type coolant.

First of all, it will be explained, referring to FIG. 1. Common construction of embodiment is as follows:

A compressor rotor 3a of a compressor 1 and a turbine rotor 1a of a turbine 120 are connected by a distant piece 2a. Air 14a under atmospheric condition is raised in pressure by moving blades and stationary blades in a compressor air flow path 5a of the peripheral portion of the compressor rotor 3a. It has a combustor 4a supplied with the air raised in pressure and discharged from the compressor 1. In the combustor 4a, fuel 13a and compressed air react to produce of combustion gas 15a of high temperature and high pressure. The combustion gas 15a passes through moving blades 7a and nozzle 17a in an outer peripheral gas flow path 6a of the turbine rotor 1a to generate power. The turbine rotor 1a has a plurality of discs 12a each of which has moving blades 7a at the peripheral portion and is arranged in an axial direction through spacers 11a. In FIG. 1, one pair of them is disclosed as a representative example. The turbine rotor 1a and a spacer 11a at a side of a disc are in contact with each other at a peripheral side and a gap portion is formed between the disc and a spacer adjacent thereto in a region including a central portion at a central side more inner than the contact surface.

In a first embodiment, the above-mentioned disc is made solid, the gap portion is formed between a rotor axis side region of the above-mentioned disc and the spacer adjacent to the disc, a rotor peripheral side region of the above-mentioned disc and the spacer adjacent thereto have respective contact surfaces contacting them and the above-mentioned disc has a central side communication flow path leading a fluid to the above-mentioned gap portion.

Concretely, in addition to the above-mentioned basic construction, a central portion of the above-mentioned disc 12a including the axis (or shaft center) has a solid construction, and the central side communication flow path 10a which is a third flow path is provided inside the turbine rotor 1a so as to communicate with the gap portion, in addition to a steam supply flow path 8a and a steam recovery flow path 9a. For example, the central side communication flow path 10a is provided so as to pass through the disc 12a and the spacer 11a.

For example, from a part of compressed air of the compressor 1, a fluid is supplied to the central side communication flow path 10a, the fluid supplied in each gap formed between the disc 12a and the spacer 11a and members inside the turbine rotor 1a are heat-exchanged. The fluid after heat exchanging is discharged into a peripheral side gas flow path 6a of the gas turbine 120, for example. However, it is possible to discharge it into other apparatus members.

Thereby, since it is possible to control heat quantities transferred from/to the members of the turbine rotor 1a to/from the central side communication flow path 10a, it is possible to reduce the thermal stress. Therefore, even if centrifugal force is added under the condition that affection of the thermal stress is large, the strength required for the turbine rotor 1a can be secured.

Particularly, in the case where a supply flow path and a recovery flow path are provided, it is possible to reduce thermal stress more than in a case where flow paths inside the rotor are only the steam supply flow path 8a and steam recovery flow path 9a.

Since a temperature difference between the supply flow path and recovery flow path occurs by a value corresponding to temperature elevation due to cooling of the moving blades, the closed cooling rotor has a tendency that thermal stress becomes large, and a large temperature difference occurs between the rotor peripheral side and a central portion thereof in operation at a time of starting. The rotor peripheral portion is higher in temperature than in the rotor central portion, the rotor peripheral portion takes expansion displacement relative to the rotor central portion, and the rotor central portion shrinkage displacement relative to the rotor peripheral portion, whereby radial tensile thermal stress acts on the rotor central portion.

The above-mentioned first embodiment can suppress the excessive force applied on the rotor central portion by overlapping of the radial tensile thermal stress and centrifugal tensile stress due to rotation, whereby the strength for the turbine rotor 1a can be secured.

Another feature resides in that contact surfaces, on which a rotor peripheral region of the disc and the spacer adjacent thereto are in contact, are formed therebetween, a supply flow path passing through the above-mentioned disc and spacer at the above-mentioned region forming the contact surfaces in a axial direction of the rotor and supplying the above-mentioned coolant to cool the moving blades and a recovery flow path for the coolant heated through the moving blades are provided.

Concretely, in addition to the above-mentioned common construction, the moving blade 7a is steam-cooled blade and a closed cooling blades in which steam after cooling is recovered without being discharged into the gas flow path 6a. It is possible to provide a supply port and recovery port for coolant on the contact surface with the disc. The turbine rotor 1a is provided with both the steam supply flow path 8a for supplying steam to the moving blades 7a and the steam recovery flow path 9a for recovering the steam. Both of the steam supply flow path 8a and the steam recovery flow path 9a are formed so as to pass through the above-mentioned contact surface 16a in the rotor axis direction and pass through the above-mentioned disc 12a and the spacer 11a. For the steam supply flow path 8a and steam recovery flow path 9a, inner peripheral surfaces (inner wall surfaces) of through holes of the disc 12a and spacer 11a and the contact surface 16a are constitutional elements thereof. The both flow paths are separated from each other by the contact surfaces 16a. The coolant flows while contacting with the inner wall surfaces.

Steam supplied from a prescribed steam generation source such as a boiler is supplied into the moving blades 7a through the steam supply flow path 8a. The steam after having heat exchanged inside the moving blades is recovered through the steam recovery flow path 9a.

Thereby, it is unnecessary to provide attachments such as separation tubes, connection tubes in order to separate the steam supply flow path 8a and the steam recovery flow path 9a form each other.

As a supply flow path and recovery flow path for transferring coolant in the axial direction, it is unnecessary to use attachments such as insertion pipes for inserting in holes and connection pipes for connecting between the discs, so that it is possible to nullify the fear such as dropout, breakage of the attachments due to operation for a long time in the rotor in which large centrifugal force due to rotation and thermal stress due to temperature difference of metal are applied. Further, it is possible to prevent imbalance of the weight to the rotation shaft, caused by the dropout and brakeage of the attachments, whereby an excitation source is not made.

Figure 2:
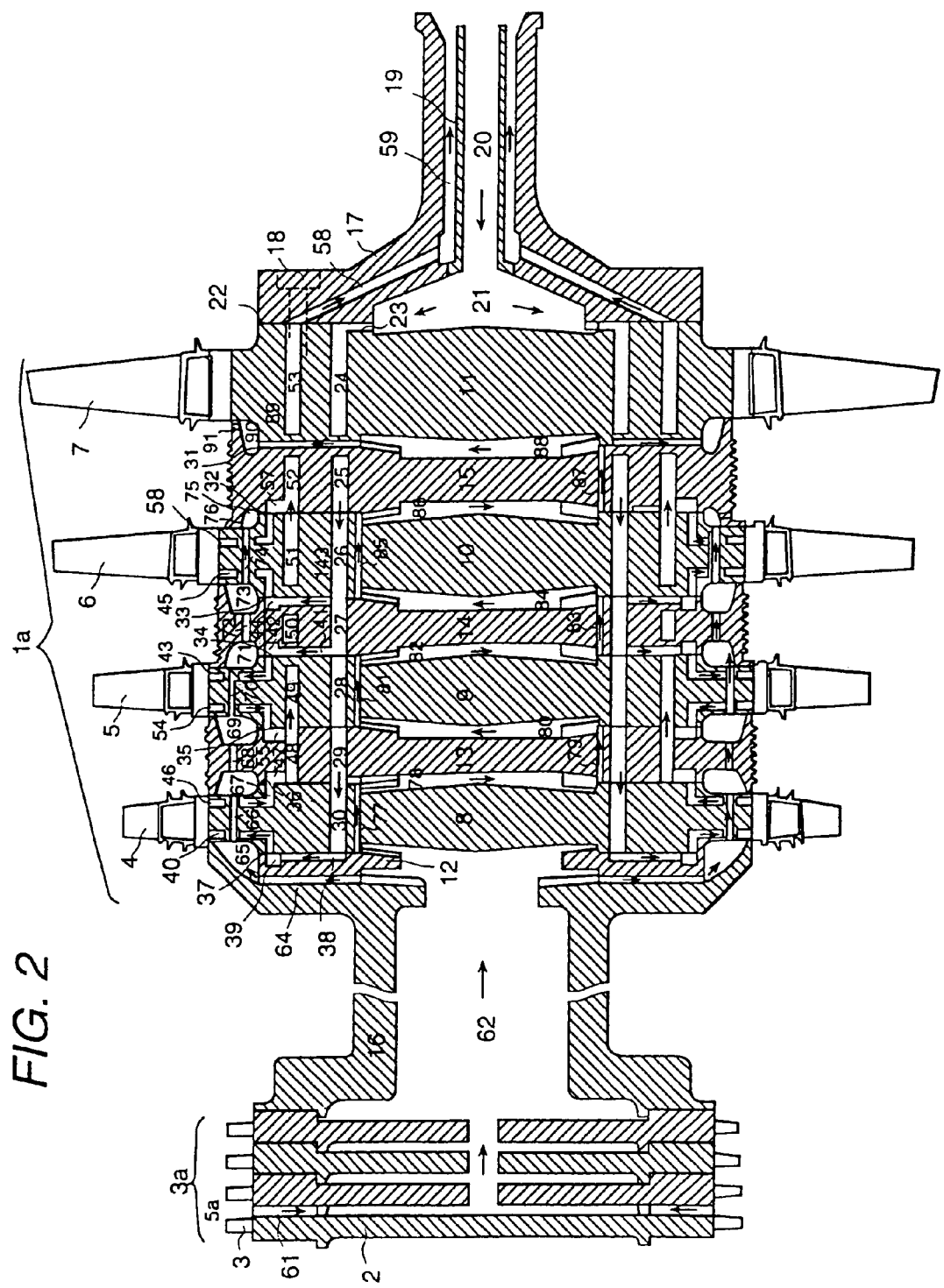
FIG. 2 is a sectional view of a rotor of a gas turbine of coolant recovery type of an embodiment of the present invention.

FIG. 2 shows a sectional view (a turbine side sectional view) of a rotor of coolant recovery type gas turbine of an embodiment, taking a 4-stage turbine as an example. This shows a case of closed steam cooling type gas turbine.

Basically, the common construction of the above-mentioned embodiment shown in FIG. 1 is applied. As the other common construction, the following construction is provided.

A gas turbine rotor is provided with a compressor rotor 3a of a compressor 1 and a turbine rotor 1a of a turbine 120 connected thereto.

The compressor rotor 3a is provided with compressor discs 2 provided with compressor moving blades 3 on a peripheral portion. The turbine rotor 1a has a turbine section 100 and a stub shaft 17 connected thereto.

The turbine section 100 comprises a first stage solid disc 8, a second stage solid disc 9, a third stage solid disc 10 and a fourth stage solid disc 11, and first stage moving blades 4, second stage moving blades 5, third stage moving blades 6 and fourth stage moving blades 7, each blade being positioned on the peripheral portion of each disc, and has a hollow spacer 12 on the closest side to the compressor 1 and solid spacers 13, 14, 15 on side surfaces of the above-mentioned discs. The stub shaft 17 is positioned on side of the fourth stage solid disc 11. The distant piece 16, the turbine section 100 and the stub shaft 17 are strongly connected by stacking bolts 18 provided so as to pass through the contact surfaces of the discs and spacers.

A second embodiment will be explained, referring to FIGS. 1 and 2.

In the second embodiment, the above-mentioned discs each have a solid construction in a region including an axis (shaft center) portion, gap portions are formed between the discs 8, 9, 10 and 11 and the spacers 13, 14 and 15 adjacent thereto at the rotor axis side, the discs 8 to 11 and the spacers 13, 14 and 15 are in contact with each other at the rotor peripheral side to form contact surfaces 31 to 36 contacting them other, and a plurality of central side communication paths(10a) 77, 81, 85 for introducing fluid into the gap portions are formed in the discs 8 to 11.

Prescribed through-holes are provided to supply warming medium (fluid) to a cavity portion between each disc 8–11 and the spacer 13, 14, 15 at a time of starting of the turbine.

Explaining the embodiment in detail, referring to FIGS. 1 and 2, the following construction is provided in addition to the above-mentioned common construction.

A cavity is formed between each solid disc and spacer on the central side including the central portion of the contact surface of the solid disc and solid spacer. The cavity 78 is formed at the central portion of the first solid disc 8 and the solid spacer 13. In the same manner, cavities formed respective discs and spacers are referred to 80, 82, 84, 86 and 88.

For the central side communication hole 10a communicating the above-mentioned cavities, holes 77, 79, 81, 83, 85 and 87 each passing through the discs 8, 9, 10 and 11 and the spacers 13, 14 and 15 are provided. The holes are provided in a region including the above-mentioned contact surfaces of each disc, etc., and so as to path through a more central side in the axial direction than the supply flow path or recovery flow path. The detailed construction is explained hereunder.

The hole 77 which passes through the first stage solid disc 8 in the axial direction is provided so as to communicate an interior space 62 and the cavity 78. The hole 79 which passes through the solid spacer 13 in the axial direction is provided so as to communicate the cavity. 78 and the cavity 80. Hereunder, in the same manner as the above, the hole 81 which passes through the second stage solid disc 9 in the axial direction, the hole 83 passing through the solid spacer 14 in the axial direction, the hole 85 passing through the third stage solid disc 10 in the axial direction and the hole 87 passing through the solid spacer 15 in the axial direction are provided so as to communicate between the cavities at the central portion. Further, a slit 89 radially formed in the contact surface 31 of the solid spacer 15 and the fourth stage solid disc 11, a donuts-shaped cavity 90 formed by the solid spacer 15 and the fourth stage solid disc 11 and a hole 91 led from the cavity 90 to a gas flow path of the gas turbine are provided. Here, the slit 89 is provided at a position where it does not cross supply holes 52, 53 and recovery hole 24, 25 on the surface 31. In this embodiment, shown is the case where flow paths from the cavity 62 to the cavity 90 are in series, and all the quantities of air flowing in the cavity 90 pass through the cavities 78, 80, 82, 84, 86 and 88, however, when pressure loss due to flowing in out of the cavities 78, 80, 82, 84, 86 and 88 becomes problem, it is possible to provide a plurality of flow paths in parallel each leading from the cavity 62 to the cavity 90 and distribute the cavities 78, 80, 82, 84, 86 and 88 to the flow paths provided in parallel, respectively.

As in a time of starting of the gas turbine, a part of compressed air of the compressor 1 is supplied to the cavities 78, 80, 82, 84, 86 and 88 in a case where the interior of the turbine rotor 1a is cold as nearly normal temperature, for example.

A part of air in the compressor air flow path 5a is flowed in the interior space 62 through the gaps between the compressor discs 2. The air flowed in the interior space 62 passes through the slit extending radially outward, flows in the hole 77 and is supplied into the cavity 78. When the air supplied in the cavity 78 flows through the central portions of the first stage solid disc 8 and first stage solid spacer 13, the air warms the central portions (axis portions) of the disc 8 and spacer 13 at the starting time. The supplied compressed air effects heat exchange in the central portions of the same disc 8 and spacer 13. The compressed air having passed through the central portions enters the cavity 80 through the hole 79. Here, it warms the central portions of the first stage solid spacer 13 and the second stage solid disc 9 at the starting time. In the same manner, in order to effect heat exchange, the compressed air enters the cavity 82 through the hole 81, enters the cavity 84 through the hole 83, enters the cavity 86 through the hole 85 and enters the cavity 88 through the hole 87. Then, the compressed air pass through the slit 89 and discharged into the gas flow path 6a through the cavity 90.

The rotor peripheral portions of the solid discs 8, 9, 10, 11 and the solid spacers 13, 14, 15 are high in temperature by the heat inputted from the working gas of the gas turbine while the rotor central portions are not easily warmed at the starting time, so that a large temperature difference occurs between the rotor peripheral side and the rotor central portions. That is, the rotor peripheral portions are higher in temperature than the rotor central portions, the rotor peripheral portions take expansion displacement relative to the rotor central portions, and the rotor central portions take shrinkage displacement relative to the rotor peripheral portions, whereby radial tensile thermal stress is applied on the rotor central portions. There is the fear that the radial tensile thermal stress overlaps with the centrifugal tensile stress due to rotation and a large stress is applied on the rotor central portions. Therefore, by practicing the present embodiment, the cavities 78, 80, 82, 84, 86 and 88 in the rotor central portions formed by the solid discs and solid spacers are taken as constitutional elements of the third flow path, and the rotor central portions can be raised in temperature by flowing the air extracted from the high temperature compressor there. That is, the temperature difference between the rotor peripheral portions and the rotor central portions becomes small and the radial tensile thermal stress in the rotor central portions are suppressed. Further, both side surfaces of cavities in the central portions of the first, second and third solid discs and solid spacers 13, 14, 15 becomes the same air temperature atmosphere, so that it is possible to prevent thermal deformation and thermal stress asymmetric with respect to right and left sides from occurring in the disc central portions.

Further, the holes provided in the above-mentioned discs 8, 9, 10 to communication between the cavities are provided in the contact regions 31 to 37, whereby affection of the centrifugal force can be reduced.

Further, those central side cooling flow paths 10a are independent from the supply flow paths and the recovery flow paths, and it is possible to control heat quantities flowing in and flowing out from the rotor members by introducing air of suitable temperature and pressure into the flow paths 10a.

Further, since the central side cooling flow paths 10a are independent from the supply flow path and recovery flow path, it is considered to provide a flow adjusting mechanism on the central side cooling flow paths 10a, and to flow air of suitable temperature and pressure only at a time of starting at which thermal stress is large. Thereby, air flowing in the central side cooling flow path 10a can be saved in quantity during steady operation, so that the efficiency is improved.

Further, the central side communication flow path 10a communicates with the gas flow path of the gas turbine through the sides of the fourth stage solid disc 11, and it is possible to prevent gas from entering the side of the discs by the air having passed through the flow path so that a part of sealing air for preventing gas from the disc side surface can be compensated with the air having passed through the central side communication flow path 10a, and a quantity of air for sealing can be reduced.

Further, in order to bring the effect of warming the central portions of the discs, etc. into more play, the holes provided in the discs 8, 9, 10 are provided at the positions where the holes formed in the discs 8, 9, 10 directly communicate between the above-mentioned adjacent cavities. Concretely, for example, the positions are on the peripheral side more outer than the shaft center of the discs in the region forming the gaps 78, 80, 82, 84, 86 and 88 between the discs and the adjacent spacers at the central side more inner than the above-mentioned contact surfaces 31–37.

The present embodiment can be practiced for a gas turbine provided with supply flow path and recovery flow path of steam for cooling moving blades.

Another feature is in that the gap portions 78 to 88 are formed between the discs 8 to 11 and the adjacent spacers thereto on the rotor axis side, contact surfaces 31 to 37 that the discs and the spacers are contacted are formed on the rotor peripheral side, and supply flow paths 24 to 30 for supplying the above-mentioned coolant and recovery flow paths 48 to 53 for recovery of the heated coolant are formed so as to axially pass through the discs 8 to 11 and spacers 13, 14 and 15.

It is explained hereunder in detail, referring to FIGS. 1 and 2. The following construction is provided in addition to the above-mentioned common construction.

Steam is supplied from an inner flow path 20 inside a separation pipe 19 provided in a central hole of the stub shaft 17, and a recovery flow path 59 for recovering the supplied steam is provided an a peripheral side of the inner flow path 20.

The fourth stage solid disc 11 and the stub shaft 17 are in contact with each other at the peripheral side, and in the region of a central side including the center, a cavity 21 of air gap formed by the disc 11 and the stub shaft 17 is provided.

The steam supply flow path 8a (first flow path) and the steam recovery flow path 9a (second flow path) are formed so as to axially pass through each disc and spacer at each contact surface.

For each of the above-mentioned flow paths, an inner peripheral surface (inner wall) of the through hole and its contact surface are constitutional elements. For example, constitutional elements of the steam supply flow path 8a are supply holes 24, 25, 26, 27, 28 29, 30 which are the above-mentioned through holes of each disc and spacer. Constitutional elements of the steam recovery flow path 9a are recovery holes 48, 49, 50 which are the above-mentioned through holes of each disc and spacer.

The above-mentioned supply-holes and recovery holes of the constitutional elements are connected by the fourth stage solid disc 11 and the contact surface 31 of the solid spacer 15, the third stage solid disc 10 and the contact surface of 32 of the solid spacer 15, the third stage solid disc 10 and the contact surface 33 of the solid spacer 14, the second stage solid disc 9 and the contact surface 34 of the solid spacer 14, the second stage solid disc 9 and the contact surface 35 of the solid spacer 13, and the first stage solid disc 8 and the contact surface 36 of the solid spacer 13. Further, the first stage solid disc 8 and the solid spacer 12 are connected by the contact surface 37.

The above-mentioned steam supply flow path 8a and the steam recovery flow path 9a are separated from each other by the above-mentioned contact surface.

Slits 23 are formed on the contact surface 22 between the stub shaft 17 and the fourth stage solid disc 11 so as to extend radially from the cavity 21 to communicate with a plurality of supply holes 24 formed in the fourth stage solid disc 11

On the above-mentioned contact surface 37, slits 38 are provided so as to communicate with the supply holes 30 and so that steam flowing in the supply holes 30 radially commmunicate with the doughnut-shaped cavity 39 provided on the peripheral side. As mentioned above, the flow paths (23, 24, 25, 26, 27, 28, 29, 30 and 38) from the slit 23 to the cavity 39, each are formed in plurality flow paths in the circumferential direction, and it is desirable to arrange them approximately equi-distant from one another.

On the above-mentioned contact surface 34, slits 41 are provided so as to communicate with the supply holes 27 or 28 and so that steam flowing in the supply holes 27 or 28 radially communicate with the doughnut-shaped cavity 42 provided on the peripheral side. On the above-mentioned contact surface 33, slits 143 are provided so as to commu- nicate with the supply holes 26 or 27 and so that steam flowing in the supply holes 26 or 27 radially flows to communicate with the doughnut-shaped cavity 44 provided on the peripherel side.

For the cavity 39 the flow paths 40 of the number corresponding to the number of the first stage moving blades 4 are provided inside the first stage solid disc 8 for supplying steam to each of the first stage solid moving blades 4. For the cavity 42 the flow paths 43 of the number corresponding to the number of the second stage moving blades 5 are pro- vided inside the second stage solid disc 9 for supplying steam to each of the first stage solid moving blades 5. Further, for the cavity 44 the flow paths 45 of the number corresponding to the number of the third stage moving blades 6 are provided inside the third stage solid disc 10 for supplying steam to each of the third stage solid moving blades 6.

For the steam which has been raised in temperature through heat exchange inside each of the moving blades, the flow paths 46 of the number corresponding to the number of the first stage moving blades 4 are formed for recovering the steam from the first stage moving blades 4 into the interior of the first stage solid disc 8, and the flow paths 46 communicate with the cavity 47 formed in doughnut-shape on the contact surface 36 of the solid spacer 13 and the first stage solid disc 8.

In the same manner, the flow paths 54 are formed for recovering the steam from the second stage moving blades 5 into the interior of the second stage solid disc 9, and the flow paths 54 communicate with the cavity 55 formed in doughnut-shape on the contact surface 35 of the solid spacer 13 and the second stage solid disc 9. In the same manner, the flow paths 56 of the number corresponding to the number of the third stage moving blades 6 are formed for recovering the steam from the third moving blades 6 into the interior of the third stage solid disc 10, and the flow paths 56 communicate with the cavity 57 formed in doughnut-shape on the contact surface 32 of the solid spacer 15 and the third stage solid disc 10.

The cavity 47 communicates with recovery hole 48 axially passing through the solid spacer 13 from the contact surface 36. The cavity 55 communicates with recovery hole 48 axially passing through the solid spacer 13 from the contact surface 35. The cavity 57 communicates with recovery hole 52 axially passing through the solid spacer 15 from the contact surface 32.

Further, the recovery hole 52 communicates with the recovery flow path 59 through the flow path 58.

The flow paths provided on the disc peripheral portion for supply/recovery of coolant to/from the moving blades are separated to be for the supply side and for the recovery side in this manner.

As for steam from a steam generator such as a boiler, etc., the steam introduced into the cavity 21 through the inner flow path 20 reaches, through the slit 23, the supply hole 24 passing axially through the fourth stage solid disc 11 from the contact surface 22.

The steam having passed through the supply holes 25, 26, 27, 28, 29 and 30 is introduced into the cavity 39 through the slit 38. The steam supplied to the cavity 21 is distributed to respective supply holes and then supplied in parallel until it reaches the cavity 39. The steam from the cavity 39 is supplied to supply ports of each first stage moving blade 4 through the flow path 40 and then introduced into the moving blades. Further, the steam having passed through the supply hole 27 is directed to the supply hole 28 while being introduced into the cavity 42 through the slit 41. The steam from the cavity 42 is supplied to the second stage moving blades 5 through the flow path 43. Further, the steam having passed through the supply hole 26 is directed to the supply hole 27 while being introduced into the cavity 44 through the slit 143. The steam from the cavity 44 is supplied to the third stage moving blades 6 through the flow path 45.

Next, recovery of the steam supplied inside the moving blades will be explained hereunder.

The steam which has cooled the first stage moving blades 4 and been raised in temperature is introduced into the cavity 47 through the flow path 46, and reaches the recovery hole 48. Further, the steam having cooled the second stage moving blades 5 and been raised in temperature is introduced into the cavity 55 through the flow path 54, and jointly flows in the recovery hole 48. Further, the steam having cooled the third stage moving blades 6 and been raised in temperature is introduced into the cavity 57 through the flow path 56 and jointly flows in the recovery hole 52.

The steam having reached the recovery hole 53 passes through the center-oriented flow path 58 provided inside the stub shaft 17 and is recovered out of the rotor through flow path 59 formed by the stub shaft 17 and the separation pipe 19. The flow paths 48, 49, 50, 51, 52, 53 and 58 from the cavities 47, 55, 57 to the flow path 59 formed by the stub shaft 17 and the separation pipe 19, each has plural paths in the circumferential direction, the plural paths are arranged so as to be equi-distant in the circumferential direction and not to cross the supply flow paths 41 and 143, whereby the steam is recovered in parallel.

Figure 2A:
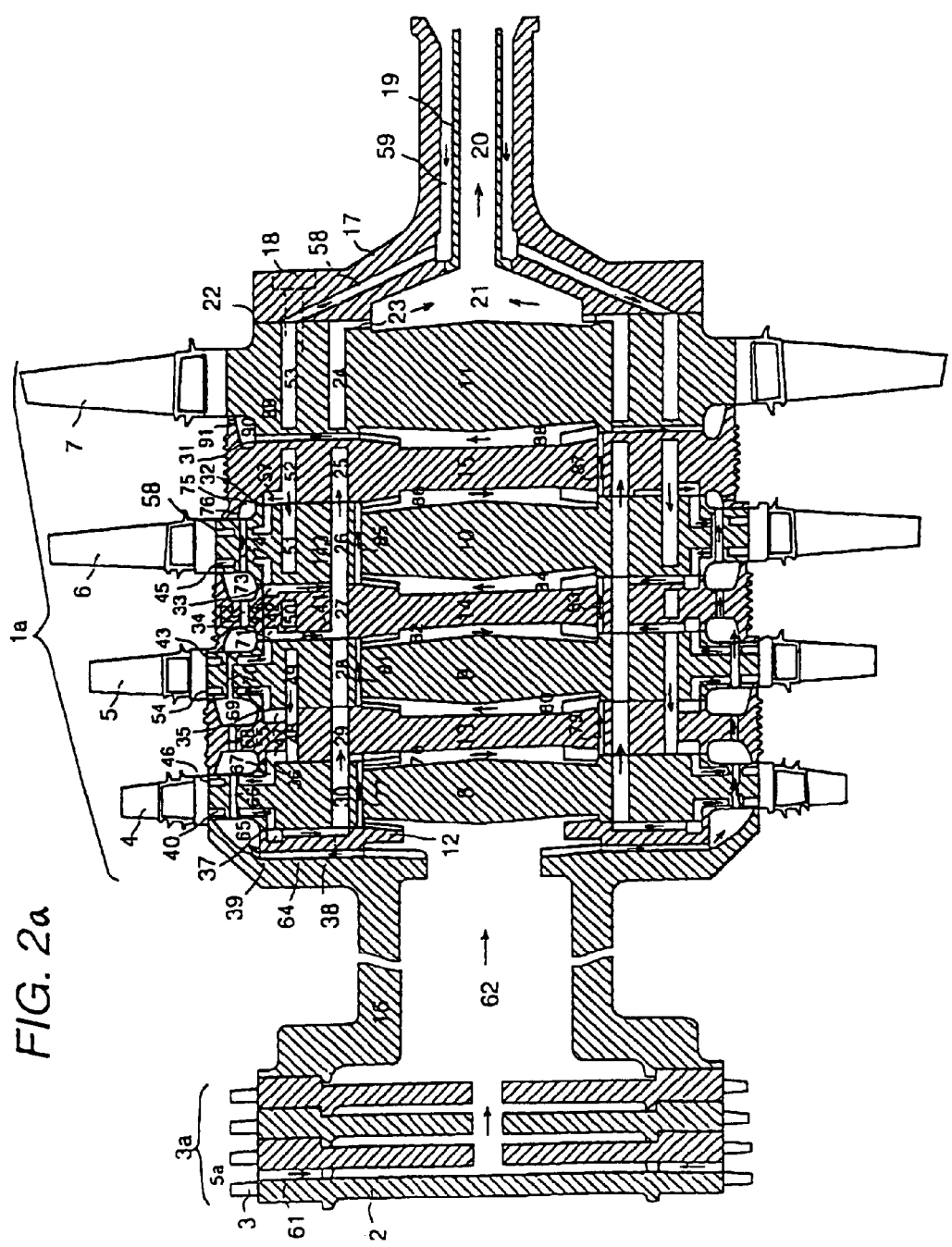
FIG. 2a is a sectional view of a rotor of a gas turbine of coolant recovery type of an embodiment of the present invention.

In the present embodiment, the steam supply port to the rotor is the inner flow path 20 of the separation pipe 19 and the recovery port is the outer flow path 59 of the separation pipe 19. However, it is possible to reverse the supply port and the recovery port, that is, it is possible to flow the steam in reverse as shown in FIG. 2a.

In the above-mentioned embodiment, the steam recovery flow path is arranged between the adjacent steam supply flow paths and on the peripheral side more outer than the supply flow paths within the region in which the above-mentioned contact surfaces exist. Thereby, a temperature gradient of the discs and the spacers can be made small at a starting time.

Further, on the contrary, in the case where the steam recovery flow path is arranged between the adjacent steam supply flow paths and on the central side more inner than the supply flow paths, more stable temperature can be secured for bearing metal of a bearing portion (not shown) arranged to support the stub shaft 17.

Alternatively, it is possible not to compose so as to be supplied and recovered from the stub shaft 17 as in the present embodiment.

Thereby, as constitutional flow paths of the supply flow paths and the recovery flow paths, both first flow paths for supply of supply holes 24, 25, 26, 27, 28, 29, 30 passing axially through the discs and spacers from inside the contact surfaces of the sides of the solid discs and the spacers and second flow path for recovery of the recovery holes 48, 49, 50, 51, 52, 53 are provided, the first flow paths and the second flow paths are separated by the contact surfaces 31, 32, 33, 34, 35, 36 of the discs and the spacers. That is, attachments such as separation pipes, connecting pipes are not necessary for separation of the first flow paths and the second flow paths, so that there is no concern that the attachments fall off and are broken by the centrifugal force and the thermal stress and the reliability inside the rotor is improved drastically.

Further, the discs of the present embodiment should be provided with wider contact surfaces than in the case where any ones of coolant supply flow path and coolant recovery flow path is formed so as to pass through the contact surfaces 31 to 37.

Therefore, even if affection of the centrifugal force becomes large by making the discs solid and the stress applied on the central portion is large, more stable discs can be provided. Further, it can be applied for a gas turbine provided with hollow discs having holes at the central portion thereof. Further, The reliability of the gas turbine can be further improved by adopting it together with the third embodiment.

On the other hand, it is also can be applied for a gas turbine provided with hollow discs having holes at the disc central portions (shaft center).

Further, another feature is in that contact surfaces on which the above-mentioned discs 8 to 11 and the spacers 13, 14 and 15 contact each other are formed between the discs 8 to 11 and the spacers 13, 14 and 15, and outside flow paths(110a) 65, 66, 67, 68, 69, 70, 71, 72, 73, 74, 75, etc. are provided which pass through an outer peripheral side of the region forming the contact surfaces, pass through the above-mentioned discs and spacers in the rotor axis direction and lead a fluid of lower temperature than the combustion gas flowing in the gas turbine.

Inside the rotor, there are provided the outside flow paths 110a of the fourth flow paths different from the above-mentioned supply flow path and recovery flow path.

Constitutional elements of the outside flow paths 110a are holes passing through the peripheral side of each disc in the contact region with the adjacent spacer and cavities formed between the adjacent spacers. On the peripheral portion more outer than the above-mentioned contact surfaces, there is provided a doughnut-shaped cavity 65 which is formed by the distant piece 16, the first stage solid disc 8 and the hollow spacer 12. A doughnut-shaped cavity 67 is provided which is formed by the first stage solid disc 8 and the solid spacer 13. In the same manner, cavities 71, 73 and 75 are provided between respective discs and spacers.

A slit 64 provided so as to extend in a radial direction on the contact surfaces 12 of the distant piece 16 with the hollow spacer 12 communicates with the cavity 65. A hole 66 is provided which passes axially through the first stage solid disc 8 and communicates the cavity 65 and the cavity 67. Hereunder, in the same manner, a hole 68 passing axially through the solid spacer 13 so as to communicate the adjacent spacers, a hole 70 passing axially through the second stage solid disc 9, a hole 72 passing axially through the solid spacer 14 and a hole 74 passing axially through the third stage solid disc 10 are provided. The cavity 75 communicates with the gas flow path of the gas turbine through a hole axially-perforated in the solid spacer 15. Here, the flow paths 66, 68, 70, 74 each have a plurality of paths which are arranged equi-distant in the circumferential direction at such positions that they do not cross the supply holes 40, 43, 45 and recovery holes 46, 54, 56 to and from the moving blades.

A part of air in the compressor air flow path 5a flows in the interior space 62 through a slit 61 between the compressor discs 2. The compressed air in the interior space 62 is supplied into the cavity 65 through a slit 64 extending radially outward between the distant piece 16 and the hollow spacer 12, and then supplied into the cavity 67 through the hole 66. Hereunder, in the same manner, the air is supplied into the cavity 75 through the hole 68, cavity 69, hole 70, cavity 71, hole 72, cavity 73 and hole 74 in turn. Then, the air is discharged from the hole 76 into the gas flow path 6a.

Further, since an outside flow path is provided as a fourth flow path passing the cavities 65, 67, 69, 71, 73, 75 formed by the discs and spacers on the peripheral side of the rotor and compressed air flow there, it is possible to interrupt heat entrance from the gas turbine gas flow path to the central portion of the turbine rotor 1a.

Further, since the air temperature atmosphere in the cavities 65, 67, 69, 71, 73, 75 on the sides of the first, second and third solid discs become same as each other, it is possible to suppress thermal deformation asymmetric with respect to right and left due to temperature difference of the sides of the discs. That is, inclining deformation of the moving blades positioned on the periphery of the discs also becomes small, and it is possible to make tip clearance of the moving blades small by a reduced deformation amount.

Further, by combining with the feature of provision of the coolant supply and recovery courses passing through the above-mentioned contact surfaces, the air of same temperature level is supplied from the compressor to the cavities 78, 80, 82, 84, 86 and 88 and the cavities 65, 67, 69, 71, 73, 75 and 90, so that a temperature difference between the rotor peripheral side and the rotor central portion can be made further small and radial tensile stress acting on the rotor central portion can be relaxed.

Further, an outside flow path 110a is made in such construction that communicates with the gas flow path of the gas turbine through the side faces of the third stage solid disc 10, whereby it is possible to prevent gas from entering the side faces of the discs by the air having passed in the outside flow path 110a. That is, a part of sealing air preventing gas from entering the disc sides can be compensated with the air having passed in the outside flow path 110a, and the quantity of the sealing air can be reduced.

The present embodiment is more effective when it is applied together with a third embodiment and fourth embodiment.

Figure 3:
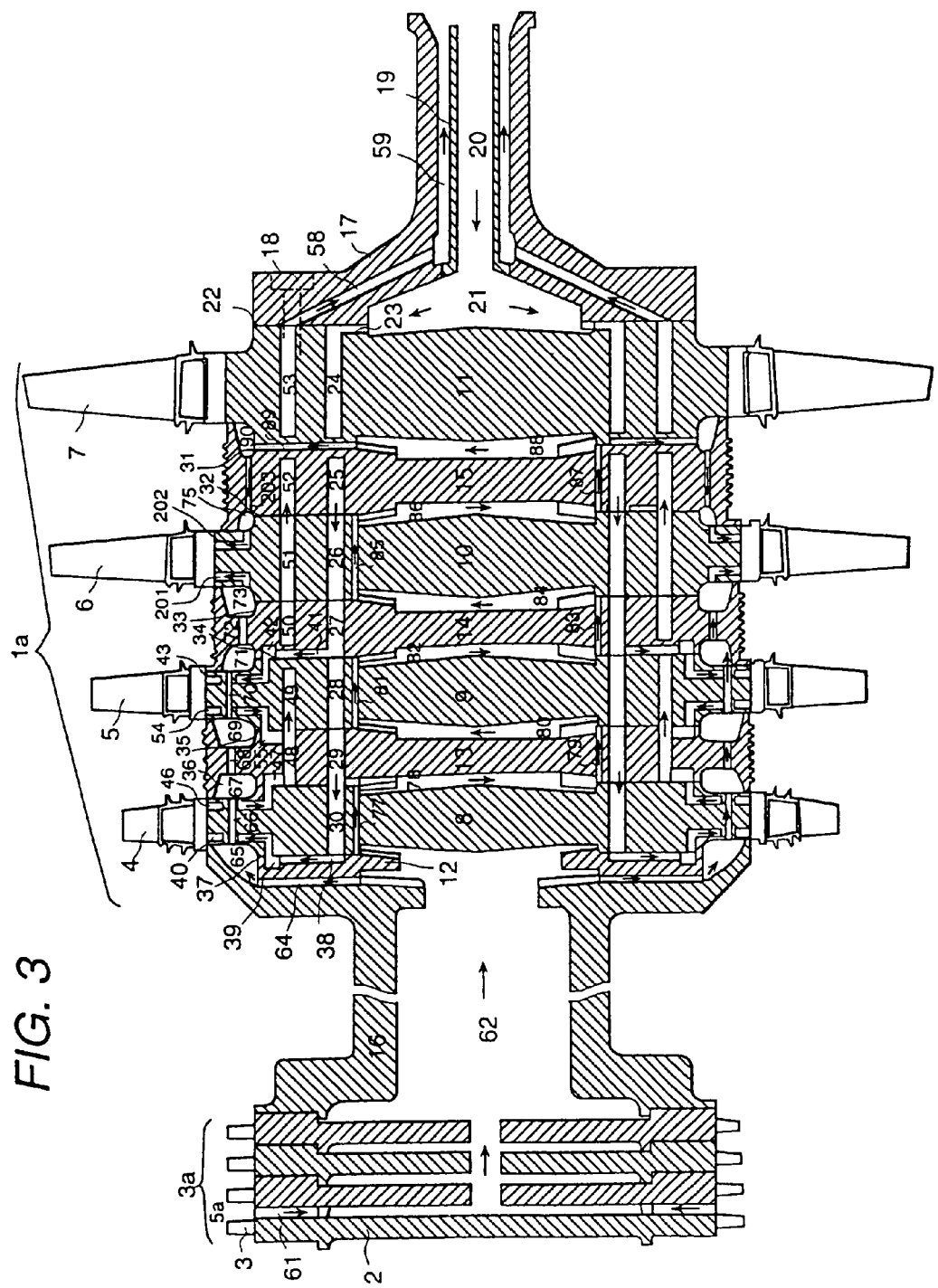
FIG. 3 is a sectional view of a rotor of a gas turbine of coolant recovery type of an embodiment of the present invention.

The third embodiment will be explained referring to FIG. 1 and FIG. 3.

The third embodiment can be basically the same as the basic construction of FIG. 2.

A main difference from the construction of FIG. 2 is in that the third moving blades 6, which are the second stage from the final stage, are air-cooled moving blades, and the above-mentioned central side communication flow path 10a and outside flow path 110a are connected to the third moving blades 6.

Hereunder, it will be described in detail. The following construction is provided in addition to the above-mentioned common construction.

A flow path 201 is provided inside the third stage solid disc 10 so as to communicate air supply ports of the above-mentioned cavity and the third stage moving blades 6. Holes 203 passing axially through the solid spacer 15 are provided so as to communicate the cavity 75 formed between the third stage moving blades 10 and the solid spacer 15 and the above-mentioned cavity 90. Further, flow paths 202 are provided inside the third stage solid disc 10 so as to the cavity 75 and the air supply ports.

A firs part of the air branched from the compressor air supply flow path 5a reaches the cavity 73 through the slit 64, cavity 65, hole 66, cavity 67, hole 68, cavity 69, hole 70, cavity 71 and hole 72 form the interior space 62. Further, a second part of the branched air reaches the cavity 75 through hole 77, cavity 78, hole 79, cavity 80, hole 81, cavity 82, hole 83, cavity 88, slit 89 and cavity 90 form the interior space 62, and through the holes radially passing through the solid spacer 15 from the cavity 90. The air reached the cavity 73 and cavity 75 flows through the flow paths 201, 202 of the number corresponding to the number of the third stage moving blades, which are formed in the third stage solid moving blades 6, and is used for cooling the third stage moving blades 6. The air after cooling is discharged into the gas flow path from the third stage moving blades 6.

By the air discharged air form the third stage moving blades 6 into the gas flow path, such a problem is considered that a power recovery quantity at the fourth stage moving blades 7 downstream thereof, that is, the plant thermal efficiency decreases. However, since the number of steam-cooled moving blades is reduced, a quantity of necessary cooling steam also decreases and the steam supply equipment can be made small-sized. That is, an equipment cost can be saved.

Further, in the present embodiment, all quantities of the air passed through the third and fourth flow paths are used for cooling the third stage moving blades 6, however, in the case where a necessary quantity of the air passing through the third and fourth flow paths is more than a cooling quantity of the third stage moving blades 6, the excessive air can be used for air sealing of side surfaces of the third stage solid disc 10 and the fourth stage solid disc 11.

Figure 4:
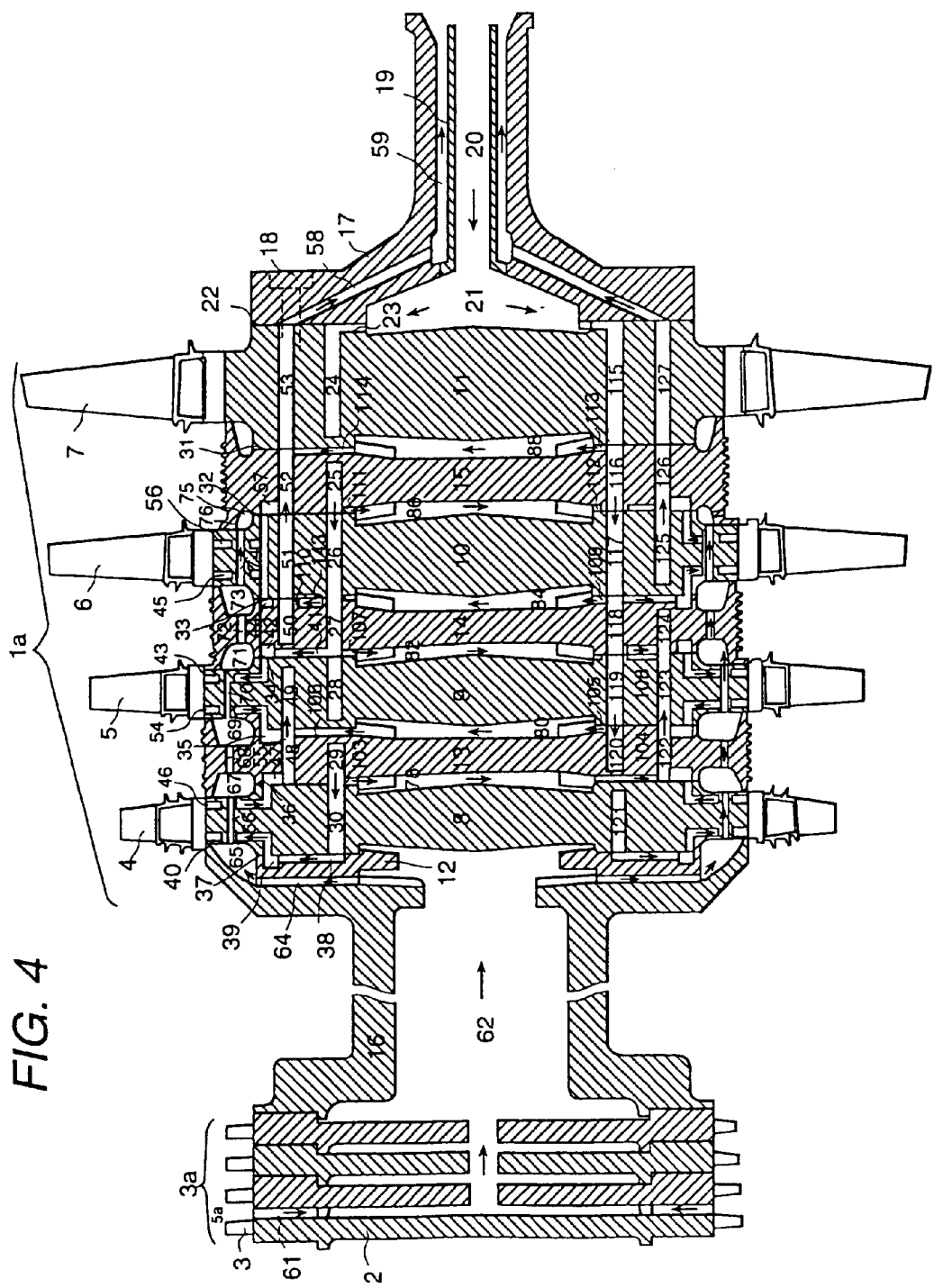
FIG. 4 is a sectional view of a rotor of a gas turbine of coolant recovery type of an embodiment of the present invention.

A fourth embodiment will be explained, referring to FIG. 1 and FIG. 4.

The fourth embodiment is constructed so that flow paths are arranged which communicate between the above-mentioned cavities 78, 80, 82, 84, 86 and 88 and the steam supply flow paths 24 to 30 for cooling moving blades or the recovery flow paths 48 to 53, and the steam flowing the above-mentioned supply flow paths is introduced into the cavities or the steam introduced into the cavities is introduced into the steam recovery flow path.

In the present embodiment, basically, construction which is the same in main parts as the construction in FIG. 2 can be applied. Further, basically, the common construction of FIG. 1 and FIG. 2 can be applied. The following construction is provided in addition to the above-mentioned common construction.

Describing in detail, the above-mentioned central side communication flow path 10a is provided so as to between the cavities 78, 80, 82, 84, 86, 88 and the steam supply flow path 8a or the steam recovery flow path 9a. A part of coolant for moving blades from the steam supply flow path 8a is supplied to the above-mentioned cavities, and then the coolant in the cavities flows so as to join the flow in the above-mentioned steam recovery flow path 9a.

Slits 103 formed to be radially oriented to the center on the contact surface 33 are provided for flowing steam to the cavity 78 from the supply hole 29 which is a constitutional element of the steam supply flow path (first flow path) 8a having an object of steam supply. Slits 104 formed to be radially oriented to the center on the contact surface 33 are provided for recovering steam from the cavity 78 into the supply hole 122 which is a constitutional element of the steam recovery flow path 9a having an object of steam recovery. Further, slits 105 and slits 106 are provided so that the steam flowed in the cavity 80 from the slit 105s is recovered through the slits 106. In the same manner, slits 107, 108, 109, 110, 111, 112, 113 and 114 are provided.

The steam passing through those flow paths is recovered without cooling moving blades.

Further, supply holes 115, 116, 117, 118, 119, 120 and 121 passing through each disc or spacer are adapted as the steam supply flow path 8a. Further, recovery holes 122, 123, 124, 125, 126 and 127 passing through each disc or spacer are applied as the steam recovery flow path 9a.

A part of the steam flowing in the supply hole 29 is supplied to the cavity 78 through the slits 103. The supplied steam is heat-exchanged with the first solid disc 8 and first slit 13 around a central portion. The discs and spacers can be warmed by the steam at gas turbine starting time. Then, it is recovered into the recovery hole 122 through the slits 104.

Since the disc portion in the vicinity of the center can be warmed, a temperature difference between the rotor peripheral side and central portion becomes small, radial tensile thermal stress at the central portion is suppressed. Further, it is possible to prevent thermal deformation asymmetric with respect to right and left sides from occurring in the disc central portion.

Industrial Utilization

According to the present invention, a gas turbine in which operational reliability of the gas turbine is improved by suppressing thermal stress acting on the rotor central portion can be provided.

What is claimed is:

1. A gas turbine in which a rotor shaft comprises a plurality of discs each having a plurality of moving blades arranged annularly on a peripheral portion, and spacers arranged between said discs, said respective discs and spacers being arranged in an axial direction in turn, comprising:
   gap portions formed between rotor axis side regions of said discs facing said spacers and adjacent spacers;
   a supply flow path for supplying refrigerant for cooling to said moving blades and a recovery flow path for recovering heated refrigerant, each of said supply and recovery flow paths being provided in said rotor shaft; and
   a flow path for introducing fluid into said gap portions, provided in said discs; and
   wherein said recovery flow path is arranged on a more radially inner side than said supply flow path, and
   said flow path for introducing fluid into said gap portion is arranged on a more radially inner side than said supply flow path.

2. A gas turbine according to claim 1, wherein the fluid introduced into said gap portions is exhausted into a gas flow path of said gas turbine.

3. A gas turbine in which a rotor shaft comprises a plurality of discs each having a plurality of moving blades arranged annularly on a peripheral portion, and spacers arranged between said discs, said respective discs and spacers being arranged in an axial direction in turn, comprising:
   gap portions formed between rotor axis side regions of said discs facing said spacers and adjacent spacers;
   a supply flow path for supplying steam for cooling to said moving blades and a recovery flow path for recovering heated steam, each of said supply and recovery flow paths being provided in said rotor shaft; and
   a flow path for introducing fluid into said gap portions, provided in said discs; and
   wherein said recovery flow path is arranged on a more radially inner side than said supply flow path, and
   said flow path for introducing fluid into said gap portion is arranged on a more radially inner side than said supply flow path.

4. A gas turbine in which a rotor shaft comprises a plurality of discs each having a plurality of moving blades arranged annularly on a peripheral portion, and spacers arranged between said discs, said respective discs and spacers being arranged in an axial direction in turn, comprising:
   gap portions formed between rotor axis side regions of said discs facing said spacers and adjacent spacers;
   a supply flow path for supplying steam for cooling to said moving blades and a recovery flow path for recovering heated steam, each of said supply and recovery flow paths being provided in said rotor shaft; and
   a flow path for introducing fluid into said gap portions, provided in said discs; and
   wherein said flow path for introducing fluid into said gap portion is constructed so as to be supplied with air extracted from a compressor, and arranged on a more radially inner side than said supply flow path,
   said recovery flow path is arranged on a more radially inner side than said supply flow path; and
   said flow path for introducing fluid into said gap portion is arranged on a more radially inner side than said supply flow path.

* * * * *